(12) United States Patent
Dushine et al.

(10) Patent No.: US 8,480,292 B2
(45) Date of Patent: Jul. 9, 2013

(54) SYSTEMS, APPARATUS AND METHODS TO RECONSTITUTE DEHYDRATED DRINKS

(76) Inventors: Boris Dushine, New York, NY (US); Joseph Kosmoski, Lafayette, CO (US)

( * ) Notice: Subject to any disclaimer, the term of this patent is extended or adjusted under 35 U.S.C. 154(b) by 226 days.

(21) Appl. No.: 12/802,173

(22) Filed: Jun. 1, 2010

(65) Prior Publication Data
US 2011/0293807 A1    Dec. 1, 2011

(51) Int. Cl.
*B01F 13/08*    (2006.01)
*B01F 7/16*    (2006.01)

(52) U.S. Cl.
CPC ............ *B01F 7/1605* (2013.01); *B01F 13/08* (2013.01)
USPC ............ 366/199; 366/206; 366/274; 366/314

(58) Field of Classification Search
USPC ............................ 366/273, 274, 199, 197, 314
See application file for complete search history.

(56) References Cited

U.S. PATENT DOCUMENTS

| | | | | |
|---|---|---|---|---|
| 2,546,949 | A * | 3/1951 | Morrison, Jr. ................ | 310/104 |
| 2,549,121 | A * | 4/1951 | Osterheld ...................... | 366/274 |
| 2,655,011 | A * | 10/1953 | Ihle et al. ....................... | 62/392 |
| 3,172,645 | A * | 3/1965 | Price, Jr. ........................ | 366/273 |
| 3,245,665 | A * | 4/1966 | Steel ............................... | 416/3 |
| 3,570,819 | A * | 3/1971 | Rosinger ....................... | 366/274 |
| 3,863,903 | A * | 2/1975 | Brehmer et al. .............. | 366/274 |
| 4,209,259 | A * | 6/1980 | Rains et al. ................... | 366/273 |
| 4,797,005 | A * | 1/1989 | Landsberger ................. | 366/343 |
| 4,887,909 | A * | 12/1989 | Bennett ......................... | 366/199 |
| 4,913,555 | A * | 4/1990 | Maeda et al. ................. | 366/205 |
| 5,547,280 | A * | 8/1996 | Wanninger et al. .......... | 366/274 |
| 5,639,161 | A * | 6/1997 | Sirianni ........................ | 366/314 |
| 5,834,739 | A * | 11/1998 | Lockwood et al. ......... | 219/468.1 |
| 6,076,957 | A * | 6/2000 | Gomes .......................... | 366/274 |
| 6,095,677 | A * | 8/2000 | Karkos et al. ................ | 366/274 |
| 6,332,706 | B1 * | 12/2001 | Hall ............................... | 366/274 |
| 6,632,013 | B2 * | 10/2003 | Wulf et al. .................... | 366/199 |
| 6,712,497 | B2 * | 3/2004 | Jersey et al. .................. | 366/274 |
| 6,722,064 | B2 * | 4/2004 | Knapp et al. .................. | 40/410 |
| 6,793,167 | B2 * | 9/2004 | Karkos et al. .............. | 241/101.2 |
| 7,314,307 | B2 * | 1/2008 | Cai ................................ | 366/273 |
| 7,629,167 | B2 * | 12/2009 | Hodge et al. ............... | 435/289.1 |
| 7,669,517 | B2 * | 3/2010 | Boussemart et al. .......... | 99/287 |
| 7,815,846 | B2 * | 10/2010 | Takahashi .................... | 266/233 |
| 7,905,728 | B2 * | 3/2011 | Piontek ......................... | 434/276 |
| 8,042,990 | B2 * | 10/2011 | Pryor et al. ................... | 366/197 |
| 8,057,092 | B2 * | 11/2011 | Ryan et al. .................... | 366/274 |
| 8,282,268 | B2 * | 10/2012 | Karkos et al. ................ | 366/273 |
| 2002/0196705 | A1 * | 12/2002 | Jersey et al. .................. | 366/274 |
| 2003/0053371 | A1 * | 3/2003 | Schoeb ......................... | 366/273 |
| 2004/0252582 | A1 * | 12/2004 | Bucher ......................... | 366/273 |
| 2005/0023193 | A1 * | 2/2005 | Kim ............................... | 210/85 |
| 2005/0068846 | A1 * | 3/2005 | Wulf et al. .................... | 366/199 |
| 2006/0007781 | A1 * | 1/2006 | Martin et al. ................. | 366/274 |
| 2007/0220168 | A1 * | 9/2007 | Parsons et al. ............... | 709/246 |
| 2007/0221068 | A1 * | 9/2007 | Boussemart et al. ........... | 99/279 |
| 2007/0247968 | A1 * | 10/2007 | Cleveland ..................... | 366/273 |
| 2008/0131957 | A1 * | 6/2008 | Ryan et al. ................. | 435/289.1 |

(Continued)

*Primary Examiner* — Tony G Soohoo

(57) ABSTRACT

The present invention is directed to systems, apparatus and methods for the reconstitution of dehydrated drinking products for use in a domestic setting. A captive magnetic mixing impeller is described. Furthermore, a dehydrated drinking product preparation system is described comprising a magnetic stir plate, a multipurpose mixing, storing, serving and drinking vessel with a captive magnetic mixing impeller and cap. Furthermore, methods for preparing dehydrated drinking products for human consumption are described using the apparatus and system.

5 Claims, 1 Drawing Sheet

U.S. PATENT DOCUMENTS

2010/0214867 A1* 8/2010 Karkos et al. .................. 366/272
2011/0293807 A1* 12/2011 Dushine et al. ............... 426/519
2012/0213029 A1* 8/2012 Villiger ......................... 366/199

* cited by examiner

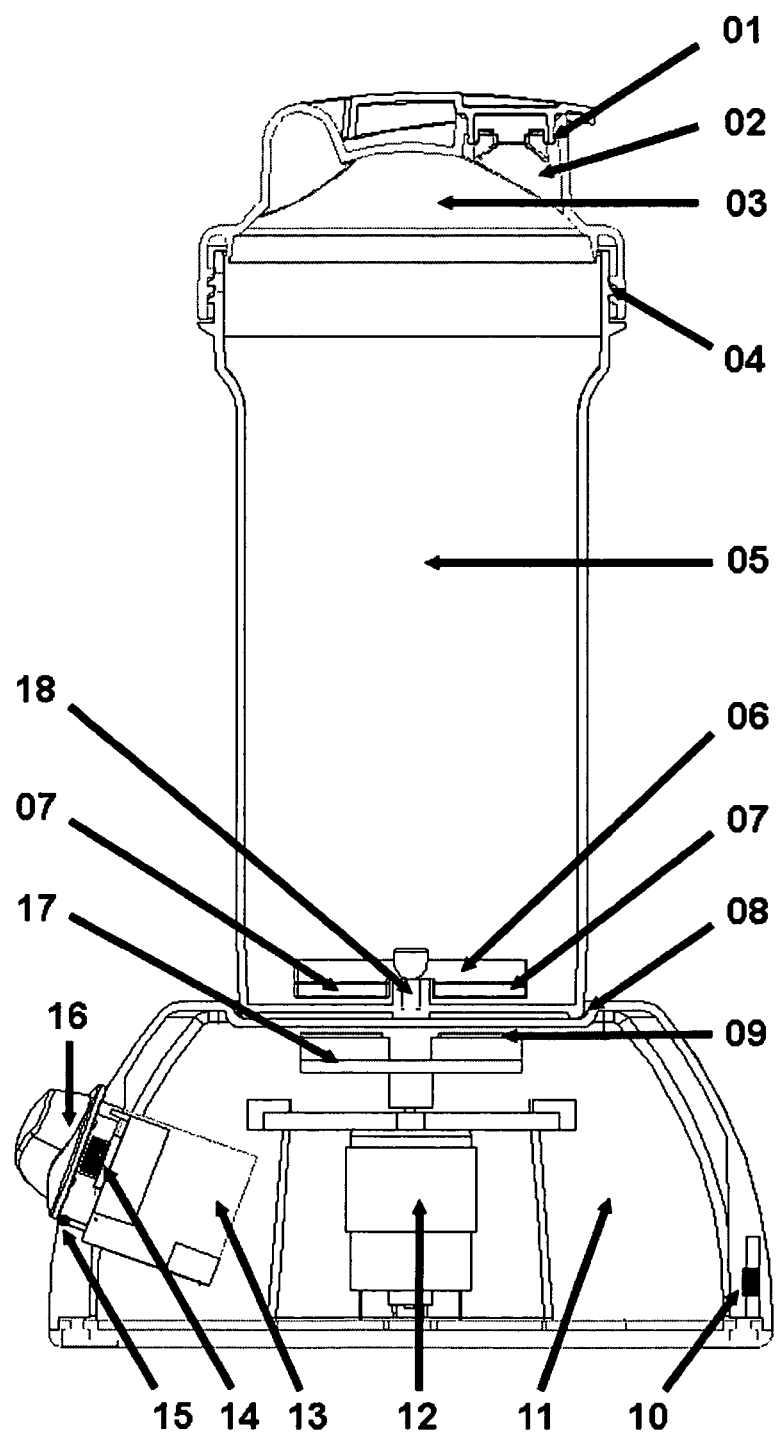

SYSTEMS, APPARATUS AND METHODS TO RECONSTITUTE DEHYDRATED DRINKS

FIELD OF THE INVENTION

The invention relates generally to the field of home consumer products. More specifically, the invention relates to dehydrated drinking product preparation systems, apparatus and methods to reconstitute dehydrated drinking products for human consumption.

BACKGROUND OF THE INVENTION

There are many dehydrated drinking products available in the marketplace today. These products generate billions of dollars in revenues annually in the U.S. and are prevalent in most consumer demographics. Despite the wide spread use of dehydrated drinking products, there are few home consumer devices or methods for the automated or semi-automated preparation of these products for human consumption.

Many resources are spent formulating dehydrated drinking products to facilitate their reconstitution. In many cases, hydrophobic proteins and lipids have been modified or eliminated due to their low solubility and difficulty of manual reconstitution. Removing these ingredients can reduce the nutritional value of the product. Hence there is a need by producers of dehydrated drinking products for systems, devices and methods that can effectively reconstitute dehydrated drinking products for human consumption.

Scientists in academic and industrial laboratories have used magnetic mixing systems for decades to prepare solutions. These mixing devices have proven useful. However, they are inappropriate for home consumers due to cost, design and utility. Significant modifications are needed to adapt this technology for the home consumer and the marketplace. More specifically, improvements are needed to integrate individual components and address limitations of the mixer, stir bar and vessels. Hence, laboratory magnetic mixers are not marketed beyond their original laboratory settings.

More specifically, stir bars are inappropriate in home consumer products. They suffer from decoupling and pose a potential choking hazard. In addition, stir bars are easily lost rendering the system useless. Hence, specific modifications are needed to address shortcomings of stir bars in magnetic mixing systems.

Blenders have made their way into the average household as a common mixing product. These devices use strong mechanical shearing forces to blend ingredients. The destructive action of blenders also introduces air into the mixture and accelerates oxidation and biomolecular denaturation, which can reduce the nutritional value of certain drinking products. Shaker bottles are also utilized in the home consumer market, and have similar shortcomings associated with blending, namely the introduction of air, denaturation and oxidation of the reconstituted drinking product. Hence, blenders and shaker bottles are inappropriate for preparing many dehydrated drinking products.

Thus, a need exists by consumers for systems, products and methods that are specifically designed to reconstitute dehydrated drinking products for human consumption.

SUMMARY OF THE INVENTION

An object of the present invention is a captive magnetic mixing impeller. More specifically, the devise comprises of one or more magnets, which are attached to a vessel and are drive by a rotating magnetic field to create a vortex for the purpose of mixing dehydrated drinking products in a home consumer setting. Specifications are described that optimize magnetic coupling of the captive impeller with the stir plate's coupling magnets. Size and shape specifications are described that optimize the mixing capacity of the captive impeller. Further specifications describe modifications to physically attach the captive impeller to the vessel via an axle, thereby significantly reducing decoupling and eliminating choking hazards typically associated with traditional stir bars.

A further object of the invention is to provide a multipurpose vessel adapted to function as a mixing vessel, storage vessel, serving vessel and drinking vessel. The captive magnetic mixing impeller is mechanically and physically integrated into the vessel, thereby creating an integrated magnetic mixing vessel. The magnetic mixing vessel represents an apparatus that can function with existing magnetic mixers or as a component of an integrated mixing system.

A further object of the present invention is a magnetic mixing system. More specifically, the system comprises of a magnetic mixer, vessel with a captive magnetic mixing impeller and cap components. Through empirical testing, specifications have been optimized to improve the synergy of each component. The adaptations to the components maximize the efficiency and utility of the apparatus for preparation of dehydrated drinking products.

A further object of the present invention is a fully integrated dehydrated drinking product preparation system adapted for use in a domestic setting. Magnetic mixing technology lacks specific component integration and does not consider utility for consumption. The materials and design of current laboratory magnetic mixers, vessels and stir bars are impractical for domestic use. Hence, numerous adaptations to the individual components have resulted in domestic optimization of a fully integrated dehydrated drinking product preparation system.

It is a further object of the present invention to provide methods for the reconstitution of dehydrated drinking products into liquids for human consumption. Accordingly, one object of the present invention is to provide methods for introducing dehydrated drinking products to a dynamic mixing system. Another object of the invention is to provide methods for limiting the introduction of air into the mixing system.

These and other objects and features of the invention will become more fully apparent when the following detailed description is read in conjunction with the accompanying examples. However, it is to be understood that both the foregoing summary of the invention and the following detailed description are of a preferred embodiment, and not restrictive of the invention or other alternative embodiments of the invention.

BRIEF DESCRIPTION OF THE DRAWINGS

FIG. 1 is a drawing of dehydrated drinking product preparation system according to various embodiments of the invention.

DETAILED DESCRIPTION OF THE INVENTION

Definitions

Within the practice of the present invention "magnetic stir plate" refers to any mechanical motorized device that can rotate a captive magnetic mixing impeller within a vessel via magnetic coupling for the purpose of mixing or reconstitution. Virtually any modification of magnetic stir plate is contemplated by this invention.

Within the practice of the present invention "captive magnetic mixing impeller" refers to a device that is physically attached within a vessel and is rotated within the horizontal plane via magnetic coupling to the magnetic stir plate's coupling magnets. Virtually any modification of captive magnetic mixing impeller is contemplated by this invention.

Within the practice of the present invention "reconstitution" refers to combining and mixing a dehydrated drinking product with a liquid, or combining and mixing more than one liquid. Virtually any modification of reconstitution is contemplated by this invention.

Within the practice of the present invention "dehydrated drinking product" refers to any concentrate, crystal, powder, syrup or ingredient that can be reconstituted or mixed with a liquid for human consumption. Virtually any modification of dehydrated drinking product is contemplated by this invention.

Within the practice of the present invention "coupling magnets" refers to one or more magnets within the magnetic stir plate that drive the captive magnetic mixing impeller via magnetic coupling. Virtually any modification, of coupling magnets is contemplated by this invention.

Within the practice of the present invention "coupling" or "magnetic coupling" refers to an overlapping magnetic force between the magnetic stir plate's coupling magnets and the captive magnetic mixing impeller's magnets. Virtually any modification of coupling or magnetic coupling is contemplated by this invention.

Within the practice of the present invention "decoupling" refers to breaking the magnetic coupling force between the magnetic mixer's coupling magnets and the captive magnetic mixing impeller. Virtually any modification of decoupling is contemplated by this invention.

Within the practice of the present invention "vessel" refers to any container used for mixing, storing, serving or consuming dehydrated drinking products. Virtually any modification of vessel is contemplated by this invention.

Within the practice of the present invention "magnetic mixing vessel" refers to any vessel with a captive impeller that is physically attached within the vessel. Virtually any modification of magnetic mixing vessel is contemplated by this invention Within the practice of the present invention "integrated dehydrated drinking product preparation system" refers to any device or kit product that comprises of a fully integrated magnetic stir plate, vessel with a captive impeller and cap, which is used to reconstitute drinking products for human consumption. Virtually any modification of integrated dehydrated drinking product preparation system is contemplated by this invention Invention Overview In a preferred embodiment an integrated dehydrated drinking product preparation system shown in FIG. 1 was constructed, comprising of a magnetic stir plate 11, magnetic mixing vessel 05 with a captive magnetic mixing impeller 06 and cap 03. The components of the apparatus were fully integrated with each other to optimize mixing and utility for a home appliance. Specifications for each component are further described.

Referring to FIG. 1, the cap 03 includes a drinking port 02 with a leak proof drinking port seal 01. The cap further includes a series of threads, which make a leak proof seal 04 with the vessel 05. The vessel also has a set of matching threads to the cap in providing a leak proof seal 04. The vessel is a multi-purpose vessel and functions as a mixing, storage, serving and drinking vessel. The opening of the vessel located at the top by the threads is about three inches in diameter. The vessel is about twice as tall as it is wide, with additional headroom. The axle 18 is an integrated part of the vessel in this embodiment, and is molded as part of the vessel. The captive magnetic mixing impeller 06 is attached to the vessel through the axle and is free to rotate in the horizontal plane. The captive magnetic mixing impeller 06 is made from plastic and rare earth magnetic parts. The captive magnetic impeller has two magnets 07 with vertical summed magnetic field vectors, and the entire captive magnetic mixing impeller assembly is encapsulated. The magnetic mixer 11 has a recessed positioning element 08. The vessel rests within the magnetic mixer's positioning element. The magnetic mixer further includes a vertically mounted PC board with microcontroller 13 and LED 15. The linear speed control interface includes a control knob 16 and potentiometer 14. The coupling magnets 09 are aligned to optimize magnetic field overlap with the captive magnetic mixing impeller. The coupling magnets are attached to the rotary bar 17, which is made from iron and plastic and are rotated in the horizontal plane by the DC motor 12. A DC power jack 10 can accept power from an AC wall mounted transformer or battery pack, not shown.

In a preferred embodiment, decoupling is greatly reduced through the physical attachment of the captive magnetic mixing impeller to the vessel. This innovation restricts the movement of the captive magnetic mixing impeller to rotate within the center of the vessel's horizontal plane directly above the coupling magnet's rotational plane. Unlike stir bars, the center point of the captive magnetic mixing impeller cannot move in either the x, y or z direction. This innovation dramatically reduces decoupling when compared to traditional stir bar designs. Furthermore, the magnetic mixing impeller is just above the bottom surface of the vessel, thereby reducing friction and noise associated with traditional magnetic stir bars.

In a related embodiment, re-coupling is greatly improved through the physical attachment of the captive magnetic mixing impeller to the vessel. This innovation restricts the movement of the captive magnetic mixing impeller to rotate within the center of the horizontal plane directly above the coupling magnet's rotational plane. Unlike stir bars, the center point of the captive magnetic mixing impeller cannot move in either the x, y or z direction. Therefore, upon decoupling, the captive magnetic mixing impeller is still aligned with the magnetic field of the coupling magnet's magnetic field, thereby improving re-coupling.

Numerous stir bars are commercially available. Stir bars come in many shapes and sizes. Unlike laboratory stir plates that are designed to function with many different stir bar shapes and sizes with some loss of optimization, the design of the integrated dehydrated drinking product preparation system functions with a captive magnetic mixing impeller of a specific shape and size that is optimized to the specific magnetic field of the magnetic stir plate's coupling magnets. In the preferred embodiment the optimized captive magnetic mixing impeller is oblong and approximately bar shaped measuring about 2 inches in length and about $3/8$ inch in diameter with either a cylindrical, oval, square, triangular and or rectangular cross section. The captive magnetic mixing impeller is also encapsulated with PTFE (polytetrafluoroethylene) or other plastic materials.

In the preferred embodiment, the captive magnetic mixing impeller is physically attached to the vessel through a vertical axle. The axle may be part of the vessel, captive magnetic mixing impeller or it may function as an independent part. In the preferred embodiment, the axle is attached at the center bottom of the vessel and positioned in the center of the captive magnetic mixing impeller. The captive magnetic mixing impeller freely rotates in the horizontal plane perpendicular to the vertical plane of the axle.

In a related embodiment, the captive magnetic mixing impeller is attached to the vessel though other devise such as a swivel, tether, bearing or any means that physically attaches the captive magnetic mixing impeller to the vessel. The attachment of the captive magnetic mixing impeller within the vessel also helps optimize magnetic coupling of the captive magnetic mixing impeller and the magnetic stir plate's coupling magnets.

In one embodiment the attachment of the captive magnetic mixing impeller is permanent and cannot be removed. In another embodiment, the attachment is semi-permanent such as an annular snap fit assembly that may be removed or disassembled. In yet another embodiment, the attachment of the captive magnetic mixing impeller is temporary, for example through a suction cup. In this embodiment, the captive magnetic impeller could stand alone as a product and be added to virtually any vessel to create a magnetic mixing vessel.

The captive impeller must have a magnetic, paramagnetic or ferromagnetic material to couple with the field of the magnetic stir plate's coupling magnets. Different materials have specific properties that can affect the overall performance of the integrated dehydrated drinking product preparation apparatus. More specifically, Alnico is a common cost affective magnetic material that was tested extensively. Results indicated that the Alnico magnets were satisfactory but had limited long term utility due to demagnetization. In the preferred embodiment, ceramic and rare earth magnets were implemented within the captive magnetic mixing impeller. Most commercially available stir bars utilize a single magnet that is encapsulated within the stir bar. In the preferred embodiment, two ceramic or rare earth magnets are encapsulated within the captive magnetic mixing impeller such that their resultant magnetic fields optimally overlap with the magnetic fields of the magnetic stir plate's coupling magnets.

In yet another embodiment, the two impeller magnets within the captive magnetic mixing impeller have a vertical magnetic field vector sum. Thus, the impeller has two magnets wherein the summed magnetic field vectors of each magnet are vertical. Preferably, the summed magnetic field vectors of the two captive magnetic mixing impeller magnets are vertical and in opposing directions, namely up and down. This configuration optimizes the field overlap with the magnetic stir plates coupling magnets.

In a related embodiment, the magnetic coupling reach of the coupling magnets to the captive magnetic mixing impeller is greatly increased due to overlapping vertical summed magnetic fields. Standard stir bar typically have a horizontal summed magnetic field and have a useful magnetic coupling reach no more than 5 mm. In comparison, a captive magnetic mixing impeller (with similar strength magnets as the aforementioned stir bar) that has a vertical summed magnetic field has a useful magnetic reach to the same magnetic stir plate of about 10 mm. Thus, the useful magnetic coupling reach between the coupling magnets and captive magnetic mixing impeller can be greatly increased by utilizing vertical summed magnetic field vectors.

The captive magnetic mixing impeller dimensions also affect the mixing capacity of the system. In turn, the optimal mixing speed is a function of the shape and size of the stir bar. In the preferred embodiment, the optimized captive impeller is oblong measuring between 1.5 and 3 inches in length, with a width between ¼ and ½ inch. These dimension of the captive magnetic mixing impeller worked bests with a magnetic stir plate capable of providing mixing speeds from zero revolutions per minute (rpm) to a maximum speed ranging from 800 rpm to 2400 rpm.

In one embodiment, the vessel is an integrated component of the dehydrated drinking product preparation system. In the preferred embodiment, the vessel is a multi-purpose mixing vessel, storage vessel, serving vessel and drinking vessel. To achieve this utility and smoothly integrate with the other components of the system, the following specifications were incorporated into the vessel design. To begin with, the exterior dimensions of the vessel at the bottom were made to fit closely within the positioning element of the stir plate. Furthermore, the opening at the top was critical to integrate with the cap. More specifically, matching threads to the cap and a leak proof fit were adapted. The opening at the top was no less than 2 inches, preferably 3 inches to allow facile addition of mixing components. In the preferred embodiment, the vessel can accommodate liquid volumes from 4 liquid ounces to about 24 liquid ounces and still allow facile mixing. Larger volume vessels can be utilized. In addition, the vessel must allow for some headspace beyond the maximum recommended liquid volume. Furthermore, empirical testing showed that for large volumes, a ratio of about 2 to 1 was optimal for height and diameter of the vessel respectively. These rough vessel dimensions showed excellent mixing and vortex dynamics.

In another preferred embodiment, the captive magnetic mixing impeller is physically integrated into the vessel, thereby creating an integrated magnetic mixing vessel. In this preferred embodiment, the lengthwise center of the captive magnetic mixing impeller is positioned onto a vertical axle that is mounted via molding to the interior bottom of the vessel. The captive magnetic mixing impeller can rotate freely in the horizontal plane of the vessel near the bottom, without actually touching the bottom. The axle is centered in the vessel and the captive magnetic mixing impeller. This single innovation of physically integrating the captive magnetic mixing impeller within the vessel to create a magnetic mixing vessel made significant improvements for addressing decoupling and eliminated the unwanted removal of the stir bar upon pouring or drinking.

In a similar embodiment, the captive magnetic mixing impeller is modified with a fixed axle that is mounted perpendicular to the lengthwise center of the impeller. The axle is positioned into the bottom center of the vessel such that the captive magnetic mixing impeller modified with the axle, can rotate freely in horizontal plane of the vessel.

In one embodiment, the magnetic stir plate is modified with a positioning element, which aligns the vessel on the stir plate. Furthermore, the positioning element assures the magnetic field overlap of the mixer's coupling magnets and the captive magnetic mixing impeller is optimal.

In another embodiment, the stir plate is modified with a linear speed control interface. The interface allows the user to adjust the mixing speed of the magnetic stir plate. As the interface is adjusted the speed of the mixing apparatus is also adjusted proportionately and linearly.

In yet another embodiment, a linear speed control interface was designed comprising of a knob, attached to a potentiometer. The potentiometer has 300 degrees of rotation and can adjust the speed of the magnetic stir plate's motor proportionately and linearly. The speed range of the apparatus was from zero rpm to as much as 2400 rpm under no load. Any speed between zero and 2400 rpm was attainable through adjustment of the linear speed control interface.

In another embodiment, coupling magnet configurations were tested and optimized for integration with a captive magnetic mixing impeller. More specifically, coupling magnets were designed to optimize the magnetic field overlap with the specific dimensions of the captive magnetic mixing impeller within magnetic mixing vessel. This is a novel integration feature since laboratory stir plate are designed to function with a wide array of different size stir bars, and not optimized for any one specific stir bar.

In one embodiment, two coupling magnets were mounted on a horizontal iron rotary bar such that their position, orientation and magnetic field were optimized to couple with the magnets of the captive magnetic mixing impeller. The center of the magnetic fields of the two coupling magnets was separated by about two inches. The iron bar played an active and synergistic role in creating the optimized magnetic field. The magnetic stir plate's motor rotates the rotary bar in the horizontal plane of the magnetic stir plate, and magnetic coupling drives the captive impeller within the vessel to create a vortex for mixing.

In the preferred embodiment, the summed magnetic field vectors for the two coupling magnets are vertical. Thus, the coupling magnets comprise of two magnets wherein the summed magnetic field vectors of each magnet is vertical. The two coupling magnets are oriented such that one coupling magnet's summed magnetic field vector is up while the other coupling magnet has a summed magnetic field vector that is down. To clarify, one can consider a magnet as having poles, one pole is positive and the other pole is negative. Under standard notation, the summed magnetic field vector points in the direction of the negative pole and away from the positive pole. Hence, one of the coupling magnets has the negative pole up, while the other coupling magnet has the negative pole down. In a similar strategy, the two captive magnetic mixing impeller magnets are oriented such that one summed magnetic field vector is up and the other is down. When magnetically coupled the two up field magnets (one from the stir plate's coupling magnets and one from the captive magnetic mixing impeller's magnets) are aligned and coupled. Similarly, the two down field magnets (one from the stir plate's coupling magnets and one from the captive magnetic mixing impeller's magnets) are aligned and coupled. This creates a magnetic coupling circuit. The captive magnetic mixing impeller is free to rotate within the parallel and horizontal plane of the stir plates coupling magnets. The vertical summed magnetic field design is far superior and gives much stronger coupling than traditional designs with single stir bar magnets that have a summed magnetic field vector in the horizontal plane.

In a preferred embodiment, a rotary bar made from both plastic and iron was used to mount the coupling magnets in a position and configuration that optimized magnetic coupling with the captive impeller. The plastic oriented the coupling magnets and iron bar for facile and accurate assembly. By mounting the coupling magnets on the iron bar, the ferromagnetic properties of the iron bar improved the overall strength of coupling magnets and helped maximize the vertical magnetic coupling field to the captive impeller.

In another embodiment, a horizontal stator was employed within the magnetic stir plate, which serves as the coupling magnets and creates a rotating magnetic field, which couples to and drives the captive magnetic mixing impeller. In this embodiment, the stator is oriented in the horizontal plane similar to the blades of a ceiling fan. The stator is positioned near the top center of the magnetic stir plate housing. By providing the proper pulse pattern, the stator could provide a rotating magnetic field to drive the captive magnetic mixing impeller. Many stator magnet patterns could be used to implement the driving force. In this embodiment, no motor, rotary bar or fixed magnets are used in the stir plate.

The preferred embodiment also utilized direct current (DC) electronic systems. Thus, the magnetic stir plate was fitted with a DC power jack capable of receiving power from a low voltage DC power source. In the preferred embodiment, alternating current (AC) power was transformed to DC power from a wall-mounted transformer. In this embodiment, no AC power reached the stir plate itself, thereby reducing the possibility and severity of electrical shock.

In another embodiment, the magnetic stir plate could be powered from an appropriate battery source. The magnetic stir plate was fitted with a battery pack that provided DC power through the power jack. Similarly, battery power could be provided using an adaptor from a car, boat or RV.

In the preferred embodiment, a microcontroller was mounted to a PC board that was integrated into the magnetic stir plate. The microcontroller accepts data input from the linear speed control interface. The data is processed and by the microcontroller and the appropriate action is taken according to the programmed commands. The preprogrammed microcontroller governs the action of the motor and LED lamp.

In another embodiment, the microcontroller is mounted on a vertical PC board. A potentiometer and LED are also mounted to the PC board. The PC board is held in place by the attachment of the potentiometer to the housing.

In another embodiment the stir plate is fitted with a LED indicator lamp that is visible to the user. In the preferred embodiment, the LED lamp is on when the motor is running with rmps greater than zero and the LED is off when the motor is not running or rpms are zero.

The magnetic mixing vessel with captive impeller was used with the magnetic stir plate and cap to prepare many dehydrated drinking products. In every case no decoupling was observed. To artificially create decoupling, the mixing vessel was lifted away from the magnetic mixer. Then after several seconds the captive magnetic impeller stopped rotating and the magnetic mixing vessel was placed back onto the magnetic stir pate, which was still rotating the coupling magnets at the preset speed. The captive magnetic mixing impeller magnets re-coupled with the magnetic stir plate's coupling magnets and initiated mixing once again. Under similar conditions, a traditional stir bar that was not integrated into the vessel as a captive magnetic mixing impeller could not re-couple and would randomly bounce around the vessel. The integration of the captive magnetic mixing impeller is a significant improvement to stir bars by eliminating most decoupling and improving re-coupling.

In other experiments, the improved magnetic mixing vessel with the captive magnetic mixing impeller was directly compared side by side with traditional vessels with standard stir bars of similar size and magnetic strength. Identical magnetic stir plates drove both systems with identical speed settings. In these experiments, dehydrated drinking products were added stepwise until the viscosity of the solution created decoupling. The magnetic mixing vessel with captive impeller showed significant improvement, and could withstand two to four times more viscosity than traditional stir bars before decoupling.

Of critical importance for a home consumer is the silent operation of the apparatus. It was noted that the stir bar would make noise by contacting with the vessel. In the magnetic mixing vessel the axle suspends the captive magnetic mixing impeller just above the bottom surface of the vessel, resulting in almost silent operation. This was a significant improvement for the commercialization of a domestic mixing appliance.

In another embodiment, the physical integration of the captive magnetic mixing impeller into the vessel eliminated any possibility of the stir bar falling out upon drinking or pouring of the liquid contents. This is a significant improvement for the home consumer to prevent the possibility of choking on or losing the stir bar.

In one embodiment, the cap is adapted to integrate with the vessel. In the preferred embodiment, a cap is integrated with the vessel to make a leak proof seal with the opening of the vessel. Furthermore, the cap is fitted with a drinking access port. The drinking access port is fitted with a cap with it's own leak proof seal.

The prototype in FIG. 1 was constructed with many of the aforementioned embodiments and tested extensively. This prototype, was used to prepare numerous dehydrated drinking products including: baby formula, dietary supplements, protein and amino acid based drinks, weight gainer drinks, sugar based drinks such as lemonade and Kool Aid™, chocolate milk from both powder and syrup, electrolyte drinks, fiber drinks, orange juice from concentrate and many more dehydrated drinking products. In every case, the prototype of the fully integrated dehydrated drinking product preparation system was successful in reconstituting the drinks in volumes between 4 and 24 liquid ounces. Drinking products were mixed, stored, served and consumed from the vessel. Upon consumption, it was noticed that the resultant dehydrated drinking product were more homogeneous and in some cases tasted better when compared to manual shaking or blending.

In another embodiment, different program control code was downloaded to the microcontroller of several replicate prototypes shown in FIG. 1. By uploading different programming, the same hardware of the integrated dehydrated drinking product preparation apparatus could be optimized for a specific application and niche market.

In the following embodiments, methods were tested and optimized. More specifically, the order of addition and mixing was optimized. In a preferred embodiment, the liquid is added to the magnetic mixing vessel and the vessel is place on the magnetic mixer (in either order), then the mixer speed is adjusted to make a mixing vortex without introducing air into the system, and finally the dehydrated drinking product is added and mixed to a homogeneous mixture. In a similar preferred embodiment, the dehydrated drinking product is added to a liquid under dynamic motion. Adding the dehydrated drinking product to a dynamic mixing liquid gave superior results. In comparison, adding the liquid last or adding the dehydrated drinking product to a static liquid, resulted in the formation of aggregates, which often stick to the sides of the vessel. These aggregates were difficult to dissolve or would not dissolve. Adding the dehydrated drinking products to an actively mixing system is a significant advantage over methods using blenders or shaker bottles, which require addition of liquid and dehydrated products under static conditions.

In yet another embodiment, the mixing speed is adjusted to limit the vortex from reaching the captive impeller, thereby preventing the mixing of air into the system. Unlike shaking and blending techniques, the introduction of air is avoided using the proper mixing speed. Introduction of air can result in oxidation, acidification and denaturation. When dehydrated drinking products are prepared using the integrated dehydrated drinking product preparation system at speeds that prevents the vortex from reaching the captive magnetic mixing impeller, the resultant dehydrated drinking product is free of foam and dissolved gasses, and therefore is greatly improved. Direct comparison of final volumes after preparing identical protein drinks using shaking, blending or magnetic mixing shows the integrated dehydrated drinking product preparation apparatus introduces less air and causes less denaturization than shaker bottles or blenders.

EXAMPLES

The following examples are included to demonstrate preferred embodiments of the invention. It should appreciated by those skilled in the art that the techniques disclosed in the examples that follow represent techniques discovered by the inventors to constitute preferred modes of practice. However, those skilled in the art should, in light of the present disclosure, appreciate that many changes can be made in the specific embodiments which are disclosed and still obtain a like or similar result without departing from the scope of the invention.

Example 1

The an integrated dehydrated drinking product preparation system similar to the one shown in FIG. 1 was constructed comprising of a magnetic stir plate, a magnetic mixing vessel with captive magnetic mixing impeller and cap. The following adaptations were incorporated into the components thereby improving their function and creating a fully integrated system. The stir plate specifications include: a positioning element, a linear speed control interface comprising of a knob attached to a potentiometer with 300 degrees of rotation and linear speed control from zero rpm to a maximum speed ranging from 800 rpm to 2400 rpm, two coupling magnets having vertical summed magnetic field vectors which were attached to an iron rotary bar with a plastic frame and oriented on the motor shaft to optimize vertical field overlap with the captive magnetic mixing impeller's magnets, a DC power jack, an AC to DC power transformer, a PC board with microcontroller, an optimized control program and a LED lamp. Captive impeller specification include: a roughly rectangular cross section tapered at the top, with dimensions of about 2 inches in length and about ⅜ inch in diameter, two rare earth magnets with vertical summed magnetic field vectors which overlap with the magnetic stir plate's coupling magnets and encapsulated. The multipurpose mixing, serving storage and drinking vessel specifications include: an optimal liquid volume capacity between about 4 and about 24 ounces, an opening greater than 2 inches in diameter, leak proof seal with threads that integrate with the cap, headspace, a bottom outer diameter slightly less than the diameter of the positioning element, rough dimensions wherein the height is twice the diameter and a physically integrated captive impeller attached to the vessel through a central vertical axle. The cap specifications include: leak proof seal and matching threads with the vessel and drinking port with a leak proof seal. The described integrated dehydrated drinking product preparation system was used to successfully prepare many different dehydrated drinking products for human consumption ranging in volumes from 4 liquid ounces to 24 liquid ounces.

Example 2

The apparatus described in example 1 was used to prepare 24 ounces of baby formula. The magnetic stir plate was plugged in to the power source with the linear speed control interface adjusted to zero rpms. The vessel was filled with 24 ounces of potable water. The magnetic mixing vessel with water was place on the magnetic stir plate and fitted into the positioning element. The addition of the water and the positioning of the magnetic mixing vessel onto the magnetic stir plate could be done in any order as long as they were all done before adjusting the speed of the stir plate to greater than zero. Next, the knob of the linear control interface was rotated, thereby initiating mixing by creating a vortex within the mixing vessel. The speed can be adjusted to prevent the mixing of air into the mixture. Powdered baby formula was added to the dynamically mixing system. The system was allowed to mix for 2 minutes. The linear speed interface was adjusted to reduce the speed of the magnetic stir plate to zero rpm. The mixing vessel was removed from the magnetic stir plate and the cap was placed onto the vessel. The vessel, cap and reconstituted baby formula was stored under refrigeration. When needed, the formula was poured from the vessel through the cap's drinking port into a baby bottle.

Example 3

The apparatus described in example 1 was used to prepare 16 ounces of GNC's Weight Gainer 1800 protein drink. The stir plate was plugged in to the power source with the linear speed control interface adjusted to zero rpms. The vessel was filled with about 16 ounces of potable water. The magnetic mixing vessel with water was place on the magnetic stir plate and fitted into the positioning element. The addition of the water and the positioning of the magnetic mixing vessel onto the magnetic stir plate could be done in any order as long as they were all done before adjusting the speed of the stir plate to greater than zero. Next, the linear control interface was rotated 135 degrees to roughly half speed of about 800 rpms, thereby creating a vortex within the mixing vessel. The dehydrated protein powder was added to the dynamically mixing system. The system was allowed to mix for 1 minute. The linear speed interface was re-adjusted to maximum increasing the speed of the system to about 1600 rpm. After two minutes, the linear speed interface was adjusted to zero rpm. The vessel was removed from the stir plate and the cap was placed onto the vessel. The reconstituted protein drink was consumed directly from the vessel through the cap's drinking port.

Example 4

The apparatus described in example 1 was programmed with control code that allowed speed control from zero rpm to a maximum speed ranging from 800 rpm to 2400 rpm. At first the apparatus was programmed for a maximum speed of 800 rpm. This product program configuration was ideal for preparing low viscous solutions such as iced tea or low volumes of less than 12 ounces. The relatively slow maximum speed prevented possible introduction of air due to over mixing. The same apparatus was reprogrammed with a new maximum speed of 1400 rpms. This second product program configuration was ideal for medium viscosity solution such as baby formula. Finally, the apparatus was reprogrammed with a new maximum speed of 2400 rpms. This third product program configuration was ideal for high viscosity solution of large volumes such as 24 ounces of protein supplement drinks. Hence the microcontroller was programmed with control code optimized for specific mixing applications. By programming the microcontroller with specific maximum speeds between 800 rpm and 2400 rpm, a single design could be used to make different products, each optimized for a specific method and market.

What is claimed is:

1. An integrated dehydrated drinking product reconstitution system comprising:
   a) a magnetic tablet-stir plate further comprising; a DC motor, a DC power jack, a recessed positioning element, a linear speed control interface further comprising a control knob and a potentiometer, a coupling magnet further comprising a first vertical summed magnetic field vector, a rotor bar, a PC board further comprising a microcontroller, and a LED lamp;
   b) a captive magnetic mixing impeller measuring at least 2 inches in length and at least ⅜ inch in diameter comprising; two encapsulated magnets further comprising a second vertical summed magnetic field vector, and an axel; wherein the axel is attached to a center point of the captive magnetic mixing impeller limiting movement of the center point in x, y and z directions;
   c) a multi-purpose mixing, storage, serving and drinking vessel a maximum capacity of 24 liquid ounces, an opening at least 3 inches in diameter, a headspace, a matching footprint to fit within the recessed positioning element of the magnetic stir plate, and a leak proof threaded seal; wherein the captive magnetic mixing impeller is physically and centrally attached to a bottom of the multi-purpose mixing, storage, serving and drinking vessel by the axle and the two encapsulated impeller magnets are free to rotate in a horizontal plane and are positioned just above the bottom of the multi-purpose mixing, storage, serving and drinking vessel and;
   d) a cap comprising; a leak proof seal further comprising a matching thread with to the leak proof threaded seal of the multi-purpose mixing, storage, serving and drinking vessel, a drinking port and a leak proof drinking port cap.

2. The system of claim 1 further comprising an iron and plastic rotor bar wherein:
   a) the iron and plastic rotor bar assembly is attached to a DC motor shaft within the magnetic stir plate;
   b) two coupling magnets are attached to the iron and plastic rotor bar assembly and are spaced at least about 2 inches apart by center,
   c) the iron and plastic rotor bar assembly with two coupling magnets can rotate within a horizontal plane;
   d) a third vertical summed magnetic field vector is generated by the two coupling magnets and iron and plastic rotor bar assembly which is greater than the first vertical summed magnetic field vector and;
   e) a magnetic coupling force is generated between the third vertical summed magnetic field vector and the second vertical summed magnetic field vector, wherein the magnetic coupling reach is at least 10 mm.

3. The system of claim 1 further comprising a wall mounted AC to DC transformer or a battery pack.

4. The system of claim 1 further comprising a control code adapted for mixing applications programmed in the microcontroller.

5. The system of claim 1 further comprising a magnetic coupling between the two encapsulated impeller magnets of the captive magnetic mixing impeller and the coupling magnet of the magnetic stir plate wherein the magnetic coupling has a reach of at least 10 mm.

* * * * *